July 22, 1958 W. G. STOECKICHT 2,844,052
LOAD AND TOOTH-PRESSURE BALANCING MEANS FOR PARALLEL
CONNECTED EPICYCLIC GEAR SETS
Filed July 8, 1955 4 Sheets-Sheet 1

Inventor:
Wilhelm G. Stoeckicht
by Townsend d/W Beaman
attorney

July 22, 1958　　　　W. G. STOECKICHT　　　　2,844,052
LOAD AND TOOTH-PRESSURE BALANCING MEANS FOR PARALLEL
CONNECTED EPICYCLIC GEAR SETS
Filed July 8, 1955　　　　　　　　　　　　　4 Sheets-Sheet 2

Inventor:
Wilhelm G. Stoeckicht
by Townsend␣␣␣Beaman
attorney

July 22, 1958 W. G. STOECKICHT 2,844,052
LOAD AND TOOTH-PRESSURE BALANCING MEANS FOR PARALLEL
CONNECTED EPICYCLIC GEAR SETS
Filed July 8, 1955 4 Sheets-Sheet 4

Inventor:
Wilhelm G. Stoeckicht

United States Patent Office 2,844,052
Patented July 22, 1958

2,844,052

LOAD AND TOOTH-PRESSURE BALANCING MEANS FOR PARALLEL CONNECTED EPICYCLIC GEAR SETS

Wilhelm G. Stoeckicht, Munich-Solln, Germany

Application July 8, 1955, Serial No. 520,865

10 Claims. (Cl. 74—801)

This invention relates to certain improvements in an epicyclic gear set with a rotating planetary gear wheel carrier, whose planetary gear wheels are in mesh on the one side with a substantially stationary concentric gear wheel and on the other side with a rotating gear wheel. The term planetary gear wheels in what follows includes also the case where the planetary gear wheel carrier carries only one rotatable planetary gear wheel. The invention relates to double-helical epicyclic gears as well as to spur wheel-type epicyclic gears.

For the operation of epicyclic gears of this type, where the planetary gear wheel carrier rotates, there are limitations due to the centrifugal forces set up by the rotating planetary gear wheels, when these forces become so large that they cannot be supported safely by the planetary wheel bearings. For each epicyclic gear with rotating planetary gear wheel carriers there is therefore an upper limit for the speed of rotation, or, expressed in different words, there is for a given speed of rotation of a planetary gear wheel carrier a maximum permissible diameter and thus a limit to the maximum output to be transmitted by a gear of this type. One could suppose that the power transmitted could be increased by widening the gear wheels, but in epicyclic gears there are optimum conditions for wheel widths, which are in any case taken into account in a sound design, and there are no further advantages in exceeding this width.

It is now possible to arrange two or more identical epicyclic gears in parallel, so as to be able to increase the output. But due to the unavoidable manufacturing inaccuracies and also due to the torsion-elastic deformation of shafts and planetary gear wheel carriers, the distribution of the loads on the various epicyclic gears operating in parallel will be unequal, so that the advantage of the parallel connection remains illusory.

Therefore one object of the invention is to increase the maximum output permissible for epicyclic gear sets of the indicated type.

A further object of the invention is to equalize or balance the load of a plurality of epicyclic gears connected in parallel.

According to the invention, the defects described here are removed by connecting at least two epicyclic gears in parallel and connecting the substantially stationary concentric wheels of all epicyclic gears to the body supporting their reaction torque by means of balancing members, which substantially ensure that the reaction torques of all fixed wheels are equalized. In the following, the body supporting the reaction torque of the fixed gear wheels will be denoted also by the term stationary body. It is in general convenient to make the stationary body the casing of the epicyclic gear, in which also its shafts are supported.

But it is also possible to support the shafts of the epicyclic gear in other machine casings arranged immediately next to the epicyclic gear. In a case of this type the stationary body need not be designed as a casing surrounding and supporting all parts of the epicyclic gear.

By means of the invention, an equal or approximately equal distribution of the loads onto the epicyclic gears connected in parallel is achieved, so that it is possible to improve the output of epicyclic gear units of this type to a considerable extent.

In principle it is possible to connect as large a number of epicyclic gears as desired in parallel, according to the invention, but in general the parallel connection of two epicyclic gears will be sufficient to obtain the required output.

In order that the invention may be clearly understood and readily carried into effect, the same will now be described more fully with reference to the accompanying drawings, showing further improvements and convenient embodiments of the invention, and in which.

In all illustrations the same or corresponding parts are denoted by the same reference symbol.

Figure 1:
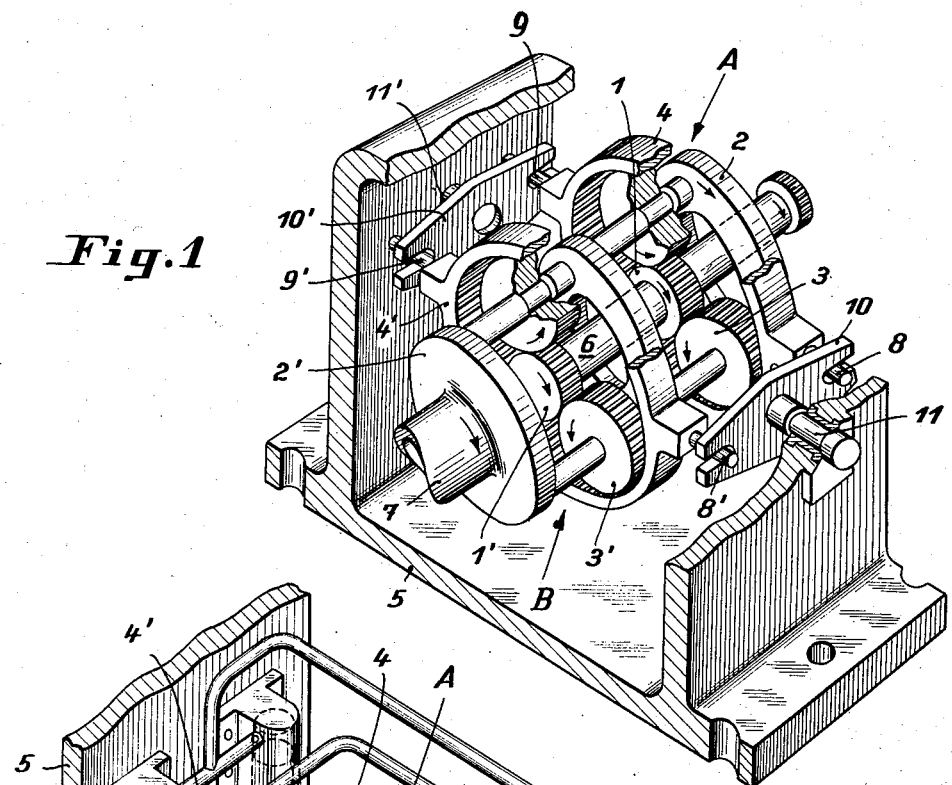
Fig. 1 is a perspective diagrammatic view of an epicyclic gear unit designed in accordance with the invention, where the equal distribution of the load is achieved by means of a pair of levers.

According to Fig. 1, the two epicyclic gears A and B are connected in parallel. Each of these epicyclic gears A and B consists of an inner central gear wheel 1 or 1', a planetary gear wheel carrier 2 or 2' supporting the planetary gear wheels 3 and 3', an outer concentric or orbit gear wheel 4 or 4' and a common casing 5. The planetary gear wheels or pinions 3 and 3' are meshing on the one hand with the inner central gear wheels 1 and 1' and on the other hand with the outer concentric gear wheels 4 and 4'. The two inner central gear wheels 1 and 1' are connected so that they rotate together; this is done in the case of the example shown here by connecting non-rotatably the two central gear wheels 1, 1' with the shaft 6. In a corresponding way the two planetary gear wheel carriers 2 and 2' are non-rotatably connected one with another; this is done in the case of the example shown by designing the two planetary gear wheel carriers 2 and 2' so that they are both forming one unit component with the shaft 7. The two outer concentric gear wheels 4 and 4' are articulated by means of joints 8 and 8' or 9 and 9' to the equal-armed levers 10 and 10', which in their turn are supported in bearings 11 and 11' in the casing 5.

The balancing arrangement, comprising a pair of levers, can also be provided for more than two epicyclic gears connected in parallel. For instance, with four epicyclic gears, each two epicyclic gears are connected by means of one pair of balancing levers, and the bearing pins of these balancing levers are then again supported in a further pair of balancing levers, whose bearing pin is then supported on the stationary body. If three epicyclic gears are connected in parallel, two epicyclic gears are first grouped by means of a pair of levers designed according to Fig. 1. The bearing pins of this pair of levers and the pins of the fixed concentric wheel of the third epicyclic gear are then grouped by means of a pair of balancing levers, whose bearing pins divide the lever arms according to the different magnitudes of the reaction torques of the one substantially stationary concentric gear wheel or the two stationary concentric gear wheels, respectively.

Figure 2:
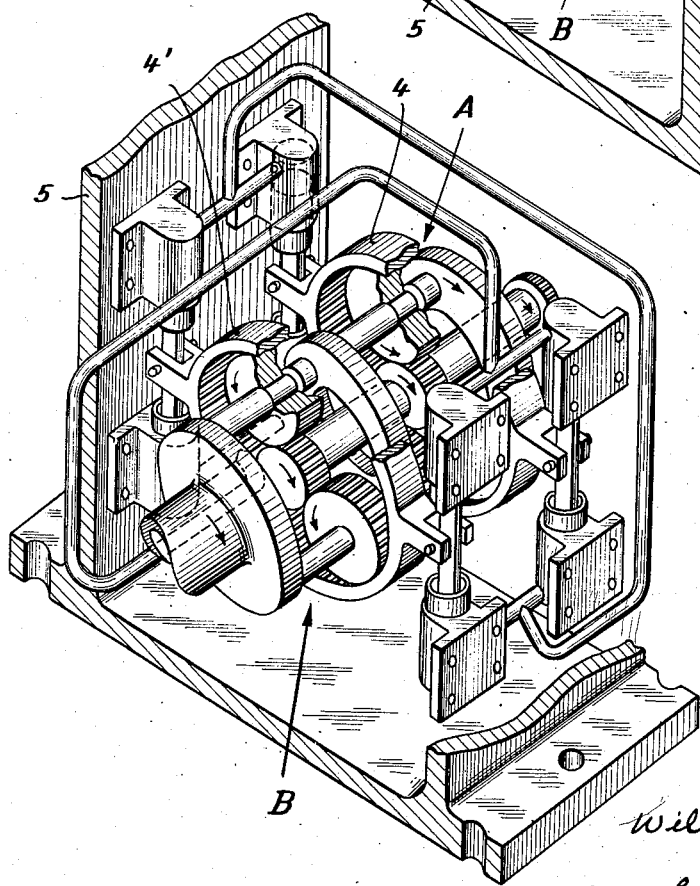
Fig. 2 is a perspective diagrammatic view of another structure designed according to the invention, where the equal distribution of the load is achieved by hydraulic means.

The structure according to Fig. 2 agrees in substantial features with that of Fig. 1. The essential difference consists in the two outer concentric gear wheels 4 and 4' being connected together and to the part supporting the reaction torque of the gear (i. e. the casing 5 in the case of the embodiment of the invention shown in Fig. 2) not by means of a mechanical linkage but by means of a hydraulic system. In order to illustrate this more clearly, the epicyclic gears A and B, with the exception of the outer concentric gear wheels shown broken, are removed from Fig. 3, which otherwise is identical with Fig. 2. The outer concertric gear wheels 4 and 4' act here on the cylinders 12, 13, 14 and 15, and 12', 13', 14' and 15' respectively, all of the same bore, which are filled with a pressure liquid and are connected in groups by means of pressure pipes 16 and 16' so as to form each a communication system, which ensures that the same liquid pressure is obtained in the pressure cylinders forming part of the system, so that the cylinders 12, 12', 15 and 15' are connected by the pipe 16, while the cylinders 13, 7', 14 and 14' are connected by the pipe 16'.

Figure 4:
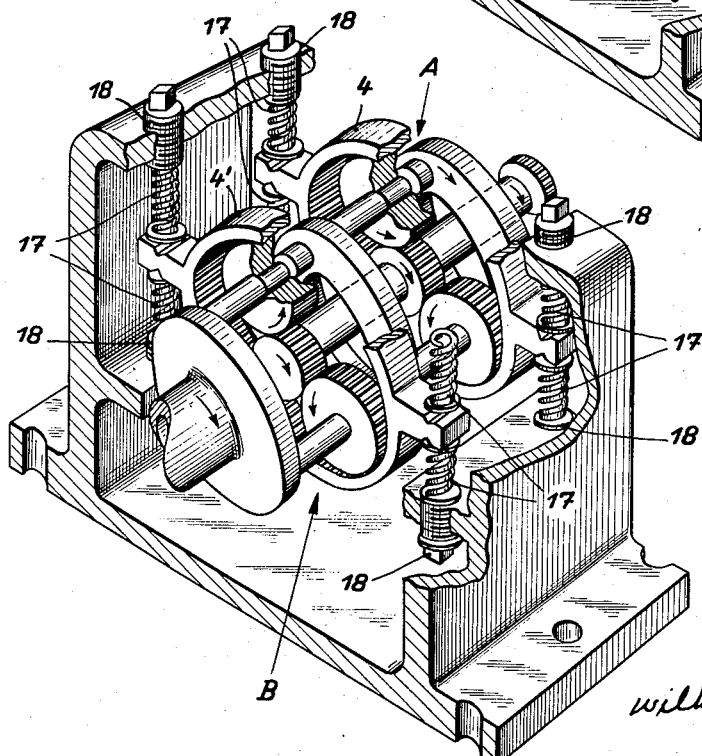
Fig. 4 is a perspective diagrammatic view of a structure similar to that of Figs. 1 to 3, but where the equal distribution of the load is achieved with the aid of pairs of springs.

In Fig. 4 the same arrangement of the epicyclic gears A and B is shown as in Figs. 1 and 2, but with the difference that in this case the two outer concentric gear wheels 4 and 4' are supported by means of spring-like elements 17, which are identical one with another, on that part which bears the reaction torque of the gear, in this case the casing 5, which is shown broken away so as to improve the clarity of the illustration. The initial stress in the spring-like elements 17 can be set by means of adjustable screws 18.

Figure 5:
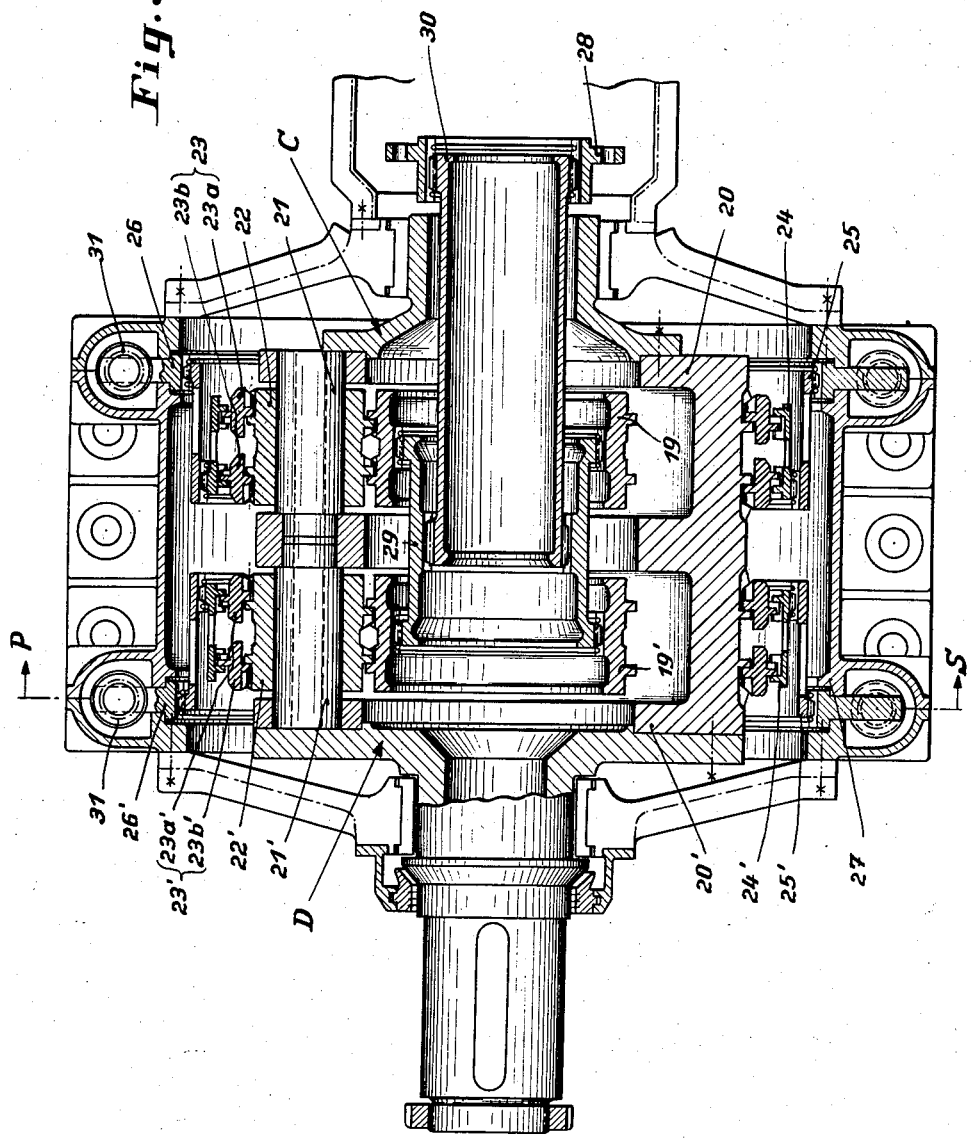
Fig. 5 is a longitudinal section through another structure designed according to the invention, where the various parts are again shown only diagrammatically but rather more accurately.
Figure 6:
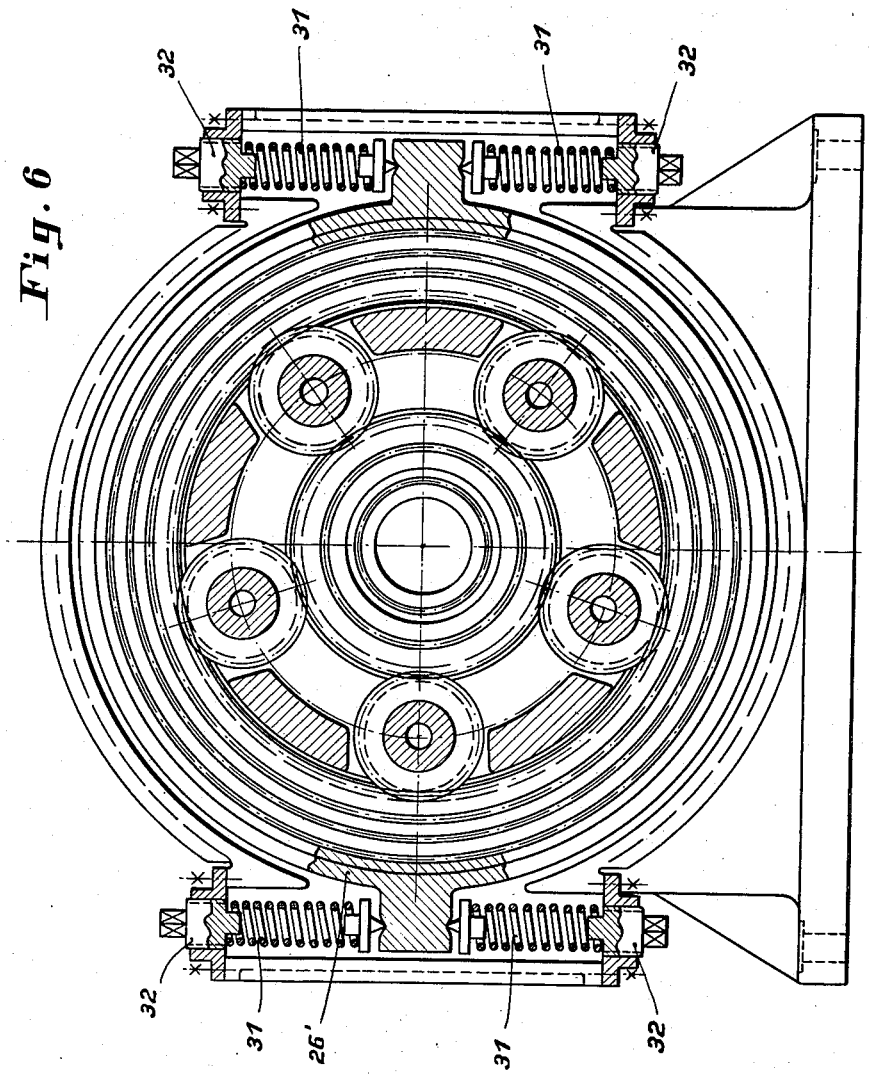
Fig. 6 is a section along the line R—S of Fig. 5.

Figs. 5 and 6 show the invention represented by the example of two double-helical epicyclic gears connected in parallel, which are provided with automatic load-balancing devices, one for each single-helically toothed system. The balancing members are here spring-like elements, as shown in the structure in Fig. 4. This example of the structure, shown in Figs. 5 and 6, is particularly interesting because this embodiment of epicyclic gears ensures the best utilization of each separate epicyclic gear: the parallel connection of the gears enables therefore the ability of epicyclic gears to transmit power to be utilized to the greatest extent. Fig. 5 shows a longitudinal section through the gear, Fig. 6 a cross-section along the plane R—S of Fig. 5. The two epicyclic gears C and D, connected in parallel, consist each of one inner double-helical central gear 19 and 19', one planetary wheel carrier 20 and 20', in which the double-helically toothed planetary gear wheels or pinions 22 resp. 22' are supported on the bearing pins 21 and 21', and the outer concentric gear wheels 23 and 23', which consist each of two single-helically toothed outer gear wheel halves 23a and 23b, and 23a' and 23b' respectively. The planetary gear wheels or pinions 22 and 22' are each in mesh with the inner central gear wheels 19 and 19' and with the outer concentric gear wheels 23 and 23', where each of the outer concentric gear wheel halves 23a and 23b, and 23a' and 23b' respectively, is in mesh with the corresponding single-helical toothing of the double-helical and single-helical planetary gear wheels or pinions 22 and 22'. The two concentric gear wheel halves 23a and 23b are flexibly or yieldably connected one with another by means of a sleeve coupling 24, and the sleeve coupling 24 is in its turn flexibly or yieldably connected, by means of a further sleeve coupling 25, to a ring 26, which can slightly rotate with reference to the casing 27. In the same manner, the two outer concentric gear wheel halves 23a' and 23b' are flexibly or yieldably connected one with another by means of a sleeve coupling 24', this is in its turn flexibly or yieldably connected by means of a further sleeve coupling 25' to a ring 26', which can perform small rotary motions with respect to the casing 27. Of these toothed couplings, the meshing coupling teeth on the inside of the coupling elements 24 and 24' are helical ones in the same manner as the appropriate concentric gear wheel halves 23a, 23b, and 23a' and 23b' respectively, while the meshing teeth of the other toothed couplings are straight teeth.

The two inner central gear wheels 19 and 19' are articulated one with another and to the driving shaft 28 by means of sleeve couplings 29 and 30. But it is also possible to connect the inner central gear wheels one with another and to articulate one of these two central wheels to the drive shaft by means of one sleeve coupling. The articulated joints of the inner central gear and outer concentric gear wheels, mentioned above, are designed in the present example as articulated toothed couplings. The two planetary gear wheel carriers 20 and 20' are connected non-rotatably one with another. The two rings 26 and 26' are supported on the part which bears the reaction torque of the gear, in this case the casing 27, through spring-like elements 31, which are preferably all identical; the initial stress in these spring-like elements 31 can be set by means of adjustable stops 32.

The operation of the invention will be explained first by means of Fig. 1:

For the transmission of power by means of the gear shown in Fig. 1, it will be assumed first that the shaft 6 is the driving shaft, and the shaft 7 fixed to the planetary gear pinion carriers 2 and 2' is the driven shaft. This is immaterial for the operation of the invention, which operates in the same manner if the shaft 7 is the driving shaft and the shaft 6 the driven shaft. If now the gear transmits a torque, where the question of the ratio in which the two gears A and B, connected in parallel, participate in the transmission of the torque will be left open for the time being, a reaction torque corresponding to its share of the transmitted torque is transmitted in each of the two gear units A and B by the outer concentric gear wheels 4 and 4' to the part which supports the torque, which is the casing 5 in the example shown here. The circumferential forces corresponding to these reaction torques are now transmitted to the equal-armed levers 10 and 10' and by these levers to the casing 5; consequently, that is, because of the fact that the two levers 10 and 10' have arms of equal length, the circumferential forces to be transmitted are equal and thus also the reaction torques of the two gear units A and B are equal, or expressed in other terms, these two gear units connected in parallel share the transmission of the power practically equally.

Figure 3:
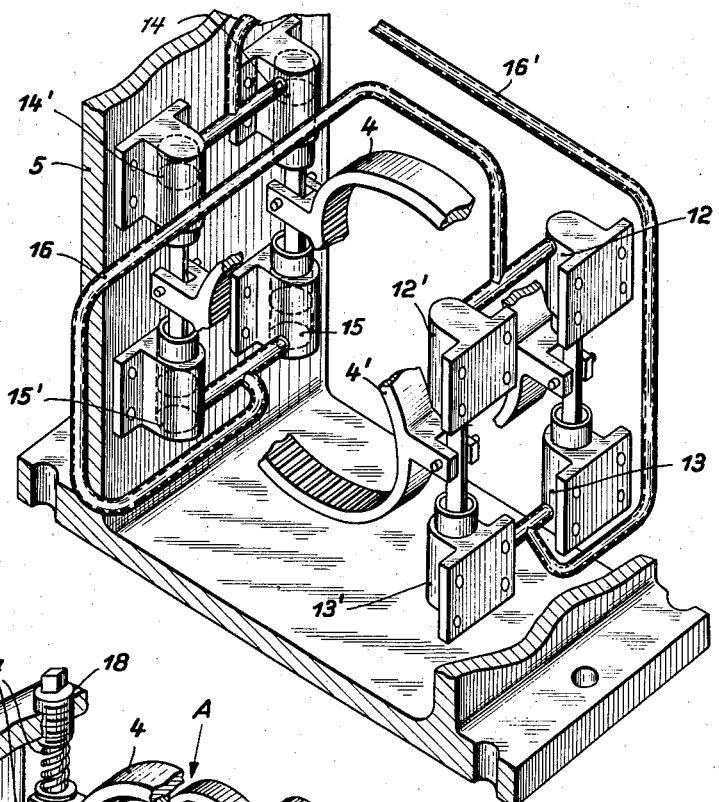
Fig. 3 is a perspective diagrammatic view intended to clarify the connections of the hydraulic load-balancing units of the structure shown in Fig. 2, where only a part of the outer substantially stationary gear wheels is indicated in the two gear units.

In the example of the structure shown in Figs. 2 and 3, the mechanical linkage 10 and 10' is replaced by a hydraulic system. In this example the circumferential forces are transmitted by the outer concentric gear wheels 4 and 4' through hydraulic pressure cylinders 12, 13, 14, 15 and 12', 13', 14' and 15', respectively to the casing 5, where the pressure chambers of two sets of cylinders are interconnected by means of a pipe 16 and 16' respectively; so that owing to the presence of a system of communicating tubes the specific liquid pressure in the various pressure cylinders is equal and thus the circumferential forces taken off the outer concentric wheels are equal, since the cross-sections of the said cylinders are equal, so that also the reaction torques transmitted by the cylinders to the casing 5 are equal. But this ensures also that the load is shared equally by the two gear units A and B.

In the example of Fig. 4 the circumferential forces acting between the outer concentric gear wheels 4 and 4' and the casing 5 are transmitted by means of spring-like elements 17, having the same dimensions and characteristics, where the spring deflections are chosen so as to be comparatively large compared with the distances which have to be equalized. Here again the circumferential forces to be transmitted to the casing will adjust themselves so as to become approximately equal, so that also the load on the two gear units A and B will be shared approximately equally.

Also in the two examples of the structure shown in Figs. 2 and 3, where hydraulic or spring-controlled balancing systems are used, there is a possibility of connecting more than two epicyclic gears in parallel, and make them share the load equally, because the hydraulic and spring-controlled systems described here can be made to balance a larger number of circumferential forces without any additional elements.

The embodiment of the invention represented in Figs. 5 and 6 shows the application of the principle of the invention to epicyclic gears with double-helical teeth, where the load is balanced automatically and independently both among the planetary wheels and also among the two related epicyclic systems. The outer concentric gear wheels 23 and 23' of the two epicyclic gears are made in two parts, so that for each of the two helical tooth directions a separate unsupported outer concentric gear wheel-half with single-helical teeth is provided, whereby the two outer concentric gear wheel-halves of each epicyclic system are articulated one with another and to that part which supports their torques. This will ensure that the automatic equal sharing of the load in each of the two epicyclic gears C and D becomes effective in all planetary gear wheels or pinions and in both parts of the system represented by the two directions of the helical teeth. The inner central gear wheels 19 and 19' of the two gear units C and D are also unsupported and articulated one with another and to the shaft 28, which can be designed optionally as the driving or the driven shaft; owing to the equal distribution of the gear tooth pressure on all meshing teeth of these inner central gear wheels 19 and 19', these are functioning so accurately in operation that no support is necessary.

The reaction torques of the two gear systems C and D, connected in parallel, are transmitted as already described by means of articulated flexible or yieldable coupling elements 24 and 25, and 24' and 25' respectively, to the annular members 26 and 26', which can rotate easily in the casing 27; these members are supported through the spring-like elements 31 on the casing 27, whereby the design and the operation of these spring-like elements is the same as in the case of the embodiments of the invention shown in Fig. 4.

But the special arrangement of the embodiment shown in Figs. 5 and 6 provides also the possibility of creating a complete drive consisting of several epicyclic gear systems connected in parallel, where an equal or approximately equal sharing of the load is guaranteed not only among the gear systems but also among all meshing teeth.

Naturally, instead of the spring-like balancing systems the mechanical or hydraulic balancing systems described with reference to the examples of the invention shown in Figs. 1 and 2 can also be applied to the arrangement according to Figs. 5 and 6.

Instead of the toothed couplings of the structure shown in Figs. 5 and 6, the sleeves 24 and 25, 24' and 25' respectively, can also be provided with rubber connections ensuring a flexible connection. The toothed couplings 24 would therefore be provided in this case with three rubber connections. Two of these rubber connections are fixed on one side to the sleeve 24, for instance, by cementing or vulcanizing. These rubber connections are on the other side fixed to the concentric gear wheel 23b or 23a. The third rubber connection of sleeve 24 is on one side fixed to this sleeve 24 and on the other side to the sleeve 25. This sleeve 25 is provided on the other side with a rubber connection fixed to the ring 26.

What I claim is:

1. In an epicyclic gear set, a stationary member, a pair of coaxial shaft members including a relatively low speed shaft, rotatably mounted upon said stationary member, a first planetary gear train, a first pinion carrier structure included in said first planetary gear train, at least one gear pinion rotatably mounted on said first pinion carrier structure, a first rotatable gear wheel, a first substantially stationary concentric gear wheel concentric to said first rotatable gear, said gear pinion of said first pinion carrier structure being in mesh on the one hand with said first rotatable gear wheel and on the other hand with said first substantially stationary concentric gear, a second planetary gear train, a second pinion carrier structure included in said second planetary gear train, at least one gear pinion rotatably mounted on said second pinion carrier structure, a second rotatable gear wheel, a second substantially stationary concentric gear wheel concentric to said second rotatable gear, said gear pinion of said second pinion carrier structure being in mesh on the one hand with said second rotatable gear wheel and on the other hand with said second substantially stationary concentric gear, said first and second pinion carrier structures being connected in parallel one with another and with one of said shaft members for rotation therewith, said first and second rotatable gear wheels being connected with the other of said shaft members for rotation therewith, and balancing means supporting said first and second substantially stationary gear wheels interposed between said concentric gear wheels and said stationary member for equalizing the reaction torques of said first and second substantially stationary concentric gear wheels received by said stationary member.

2. In an epicyclic gear set a stationary casing structure, a pair of coaxial shaft members including a relatively low speed shaft, rotatably mounted upon said stationary casing structure, a first planetary gear train, a first pinion carrier structure included in said first planetary gear train, gear pinions rotatably mounted on said first pinion carrier structure, a first rotatable sun gear wheel, a first substantially stationary gear ring, said gear pinions of said first pinion carrier structure being in mesh on the one hand with staid first rotatable sun gear wheel and on the other hand with said first substantially stationary gear ring and having axes parallel to the comon axis of said shaft members and being spaced equidistantly from and equidistantly about said common axis, a second planetary gear train, a second pinion carrier structure included in said second planetary gear train, gear pinions rotatably mounted on said second pinion carrier structure, a second rotatable sun gear wheel, a second substantially stationary gear ring, said gear pinions of said second pinion carrier structure being in mesh on the one hand with said second rotatable sun gear wheel and on the other hand with said second substantially stationary gear ring and having axes parallel to the common axis of said shaft members and being spaced equidistantly from and equidistantly about said common axis, said first and second pinion carrier structures being connected in parallel one with another and with one of said shaft members for rotation therewith, said first and second rotatable sun gear wheels being connected with the other of said shaft members for rotation therewith, and balancing means supporting said first and second substantially stationary gear rings interposed between said gear rings and said stationary casing structure for equalising the reaction torques of said first and second substantially stationary gear rings received by said stationary casing structure.

3. In an epicyclic gear set, a stationary member, a pair of coaxial shaft members including a relatively low speed shaft rotatably mounted upon said stationary member, a first planetary gear train, a first pinion carrier structure included in said first planetary gear train, at least one gear pinion rotatably mounted on said first pinion carrier structure, a first rotatable gear wheel, a first substantially stationary concentric gear wheel concentric to said first rotatable gear, said gear pinion of said first pinion carrier structure being in mesh on the one hand with said first rotatable gear wheel and on the other hand with said first substantially stationary concentric gear, a second planetary gear train, a second pinion carrier structure included in said second planetary gear train, at least one gear pinion rotatably mounted on said second pinion carrier structure, a second rotatable gear wheel, a second substantially stationary concentric gear wheel concentric to said second rotatable gear, said gear pinion of said second pinion carrier structure being in mesh on the one hand with said second rotatable gear wheel and on the other hand with said second substantially stationary concentric gear, said first and second pinion carrier structures being connected in parallel one with another and with one of said shaft members for rotation therewith, said first and second rotatable gear wheels being connected with the other of said shaft members for rotation therewith, first and second balancing means each comprising two identical opposing resilient members interposed between said stationary member and said first and second substantially stationary concentric gear wheel for supporting said concentric gear wheels and equalizing the reaction torques of said first and second substantially stationary concentric gear wheels received by said stationary member.

4. In an epicyclic gear set, a stationary member, a pair of coaxial shaft members including a relatively low speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carrier structures being connected in parallel one with another and with one of said shaft members for rotation therewith, said first and second rotatable central gear wheels being connected with the other of said shaft members for rotation therewith, resilient means, each of said first and second substantially stationary orbit gear wheels being suspended by said resilient means for free-floating motion with respect to said stationary member, said resilient means being anchored to said stationary member and consisting of two identical centering spring means, so as to equalize the reaction torques of said first and second stationary central gear wheels received by said stationary member.

5. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carrier structures being connected in parallel one with another and with one of said shaft members for rotation therewith, said first and second rotatable central gear wheels being connected with the other of said shaft members for rotation therewith, resilient means suspending each of said first and second substantially stationary orbit gear wheels for free-floating motion with respect to said stationary member, said resilient means being anchored to said stationary member and comprising two identical spring means opposing each other and adjusting means for setting the initial stress of said spring means.

6. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carrier structures being connected in parallel one with another and with one of said shaft members for rotation therewith, said first and second rotatable central gear wheels being connected with the other of said shaft members for rotation therewith, pairs of two-armed levers pivoted on the stationary member for equalizing the reaction torques of said first and second substantially stationary orbit gear wheels received by said stationary member, said first and second substantially stationary orbit gear wheels being articulary connected and supported by said two-armed levers at oppositely disposed and equally spaced locations with respect to said pivot.

7. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carriers structures being connected in parallel one with another and with one of said shaft members for rotation therewith, said first and second rotatable central gear wheels being connected with the other of said shaft members for rotation therewith, and fluid pressure balancing means supporting said first and second substantially stationary orbit gear wheels interposed between said orbit gear wheels and said stationary member for equalizing the reaction torques of said first and second substantially stationary orbit gear wheels received by said stationary member.

8. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carrier structures being connected in parallel one with another and with one of said shaft members for rotation therewith, said first and second rotatable central gear wheels being connected with the other of said shaft members for rotation therewith, for equalizing the reaction torques of said first and second substantially stationary orbit gear wheels, fluid pressure balancing means comprising for each substantially stationary orbit gear wheel two pairs of single acting opposite working chambers connected with said stationary member, piston members within said working chambers, means for connecting the piston members of each pair of said single acting opposite working chambers one with another and with said substantially stationary orbit gear wheel, and conduit means for providing a fluid connection between those working chambers of the first ones of said pairs of working chambers, which are loaded in the same direction for a given torque on the substantially stationary orbit gear wheel in the one or the other direction, one with another and with those working chambers of the second ones of said pairs of working chambers which are then loaded in the opposite direction.

9. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable central gear wheel and on the other hand with said second substantially stationary orbit gear, said first and second pinion carrier structures being connected in parallel one with another and with one of said shaft members for rotation therewith, said first and second rotatable central gear wheels being connected with the other of said shaft members for rotation therewith and balancing means supporting said first and second substantially stationary orbit gear wheels interposed between said orbit gear wheels and said stationary member for equalizing the reaction torques of said first and second substantially stationary orbit gear wheels received by said stationary member, said gear pinions of said first and second planetary gear trains being provided with double-helical teeth composed of two sets of single-helical teeth in opposite directions, while each of said substantially stationary orbit gear wheels consists of two separate halves, each provided with single-helical teeth, whose helical teeth being of the same size but directed in opposite directions, a sleeve coupling, said gear wheel halves being articularly connected by means of said sleeve coupling, and a further sleeve coupling articularly connecting the first said sleeve coupling to said balancing means for transmitting the reaction torques to said stationary member.

10. In an epicyclic gear set, a stationary member, a pair of coaxial shaft members including a relatively slow speed shaft rotatably mounted upon said stationary member, a first planetary gear train, a first pinion carrier structure included in said first planetary gear train, at least one gear pinion rotatably mounted on said first pinion carrier structure, a first rotatable central gear wheel, a first substantially stationary orbit gear wheel, said gear pinion of said first pinion carrier structure being in mesh on the one hand with said first rotatable central gear wheel and on the other hand with said first substantially stationary orbit gear, a second planetary gear train, a second pinion carrier structure included in said second planetary gear train, at least one gear pinion rotatably mounted on said second pinion carrier structure, a second rotatable central gear wheel, a second substantially stationary orbit gear wheel, said gear pinion of said second pinion carrier structure being in mesh on the one hand with said second rotatable orbit gear wheel and on the other hand with said second substantially stationary central gear, said first and second pinion carrier structures being connected in parallel with one with another and with one of said shaft members for rotation therewith, said first and second rotatable central gear wheels being connected with the other of said shaft members for rotation therewith and balancing means supporting said first and second substantially stationary orbit gear wheels interposed between said orbit gears and said stationary member for equalizing the reaction torques of said first and second substantially stationary orbit gear wheels received by said stationary member, said gear pinions of said first and second planetary gear trains being provided with double-helical teeth composed of two sets of single-helical teeth in opposite directions, while each of said substantially stationary orbit gear wheels consists of two separate halves, each provided with single-helical teeth, whose helical teeth are of the same size but are directed in opposite directions, first and second sleeve couplings, said first sleeve coupling articularly connecting said gear wheel halves together and said second sleeve coupling articularly connecting said first sleeve coupling with said balancing means for transmitting the reaction torques to said stationary member, further articulate means articularly connecting said first and second rotatable central gear wheels together and means articularly connecting said further articulate means to one of said shaft members.

References Cited in the file of this patent

UNITED STATES PATENTS

| | | |
|---|---|---|
| 1,921,296 | Harkness | Mar. 1, 1955 |
| 2,703,021 | Stoeckicht | Mar. 1, 1955 |

FOREIGN PATENTS

| | | |
|---|---|---|
| 172,796 | Germany | July 11, 1906 |
| 491,060 | France | Jan. 21, 1919 |